Figure 1:
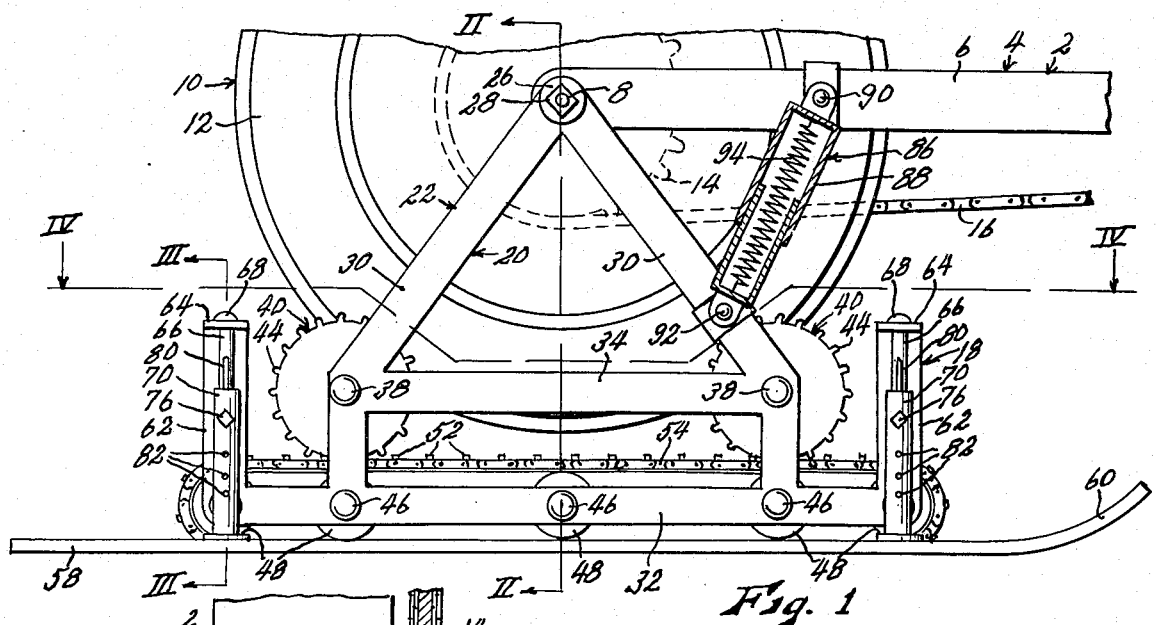

United States Patent [19]
Harris

[11] 3,885,641
[45] May 27, 1975

[54] SKI ATTACHMENT FOR MOTORCYCLES

[76] Inventor: Walter L. Harris, 8804 W. 104th Ter., Overland Park, Kans. 66212

[22] Filed: Dec. 10, 1973

[21] Appl. No.: 423,145

[52] U.S. Cl. .................................. 180/5 R; 305/20
[51] Int. Cl. ........................................ B62m 27/02
[58] Field of Search ...... 180/5 R, 5 A, 9.2 R, 9.2 A; 305/20

[56] References Cited
UNITED STATES PATENTS

| 1,068,883 | 7/1913 | Frank | 180/9.24 R |
| 3,412,820 | 11/1968 | Wachholz | 180/5 R |
| 3,596,727 | 8/1971 | Graham | 180/5 R |

FOREIGN PATENTS OR APPLICATIONS

| 241,807 | 8/1946 | Switzerland | 305/20 |
| 687,871 | 5/1930 | France | 305/20 |
| 1,505,925 | 7/1969 | Germany | 180/5 |
| 856,558 | 3/1940 | France | 180/3 |

Primary Examiner—Philip Goodman
Attorney, Agent, or Firm—John A. Hamilton

[57] ABSTRACT

A ski attachment for motorcycles consisting of a rigid frame adapted to be pivoted on the rear axle of a motorcycle and carrying an endless traction belt disposed beneath the rear wheel, and a ski attached to the frame by vertically yieldable springs and having an aperture through which the belt is projected downwardly by yielding of the springs. The belt is driven directly by the rear motorcycle wheel, so that the customary power, speed, and braking systems of the motorcycle remain fully effective with relation to the belt.

7 Claims, 5 Drawing Figures

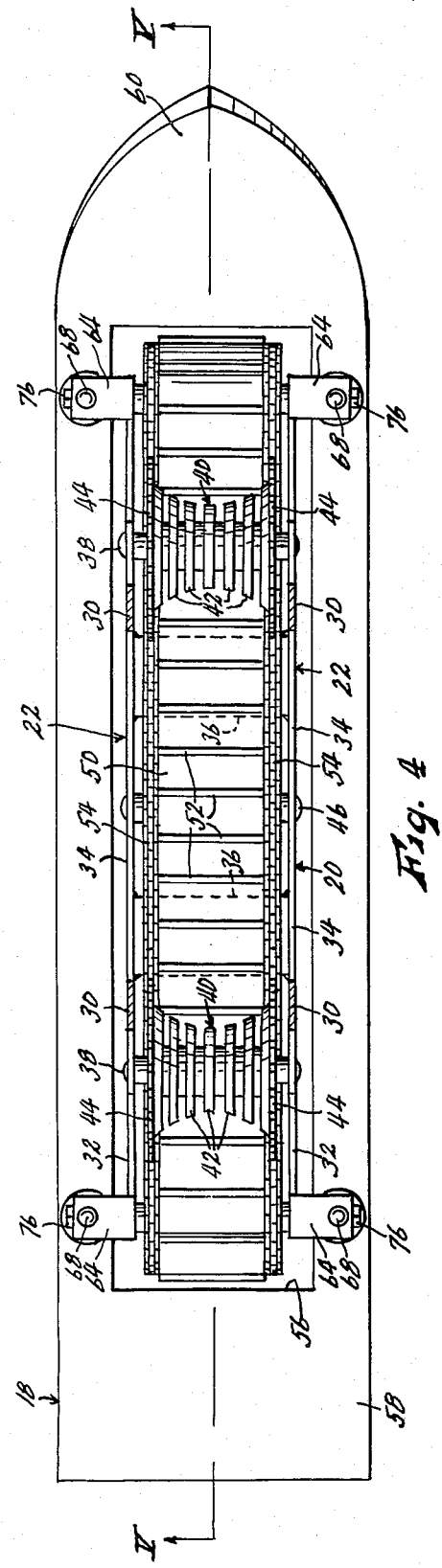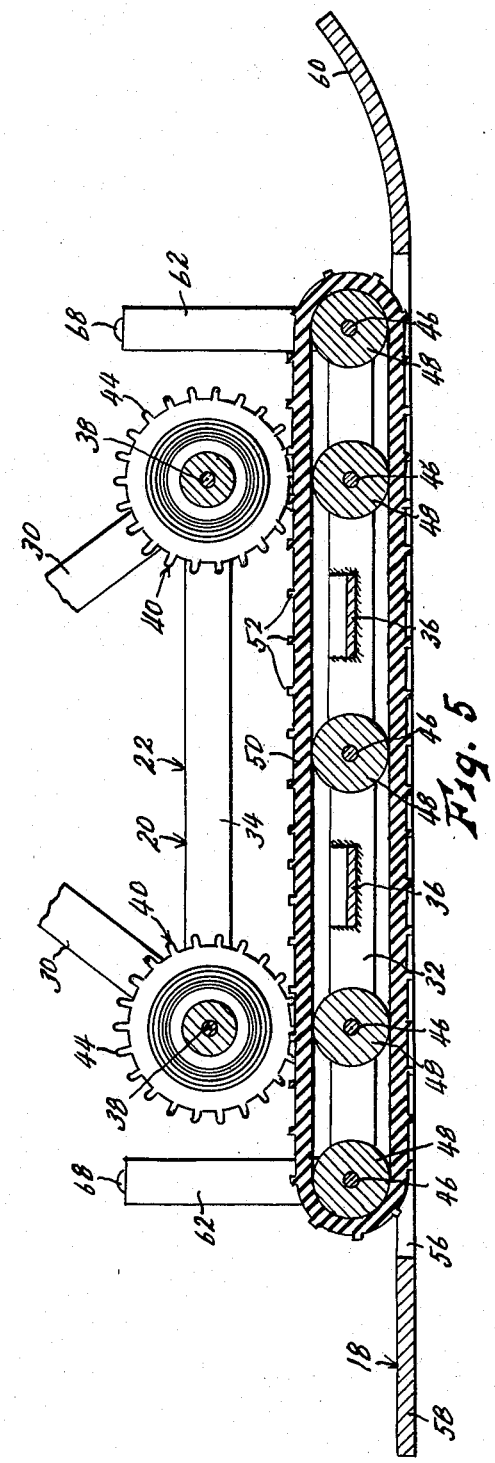

SKI ATTACHMENT FOR MOTORCYCLES

This invention relates to new and useful improvements in motorcycle equipment, and has particular reference to an auxiliary apparatus, or "kit," which may be applied to nearly any preexisting motorcycle to adapt it for operation over snow on skis.

The primary object of the present invention is the provision of a ski attachment of the character described including skis adapted to be conveniently attached to a motorcycle to support it for movement over snow surfaces, and also including propulsion means for propelling the vehicle. This propulsion means may consist of a power-driven endless traction belt carried by a ski member with its lower reach disposed beneath and parallel to the operative surface of the ski, whereby to provide a propelling traction with the snow surface.

Another object is the provision of a ski attachment of the character described with the addition of automatic means for adjusting the projection of the belt beneath the ski to the hardness of the snow surface, so that the belt projection will be sufficient for good traction, but not so great as to either lift the ski away from the snow, as might occur on hard packed snow with a fixed belt projection, or to permit bogging down and clogging of the belt, as might occur on soft, fresh snow with a fixed belt projection. This means may consist of vertically yieldable springs interconnecting the belt frame to the ski member, in such a manner that the proportions of the total load supported respectively by the belt and the ski are varied in accordance with the hardness of the snow surface, a greater proportion of the load being shifted to the ski when the snow surface is soft, and a greater proportion shifted to the belt when the snow surface is relatively hard.

A further object is the provision of a ski attachment of the character described in which the traction belt is driven directly by the motorcycle power plant through the rear motorcycle wheel. This provision greatly simplifies and reduces the cost of the attachment itself, and also provides that the usual speed control and braking systems of the motorcycle remain effective to control the belt.

Other objects are simplicity and economy of construction, and efficiency and dependability of operation.

Figure 2:
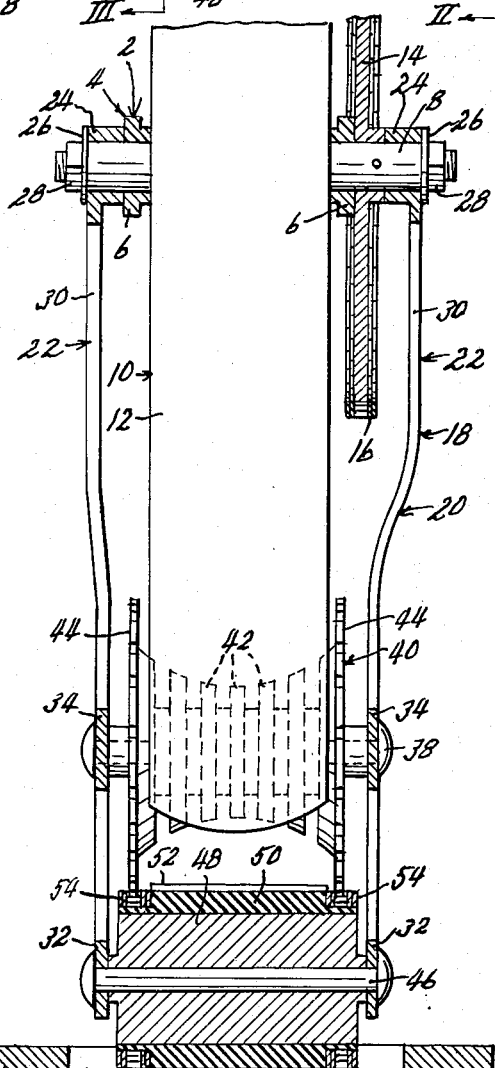
Figure 3:
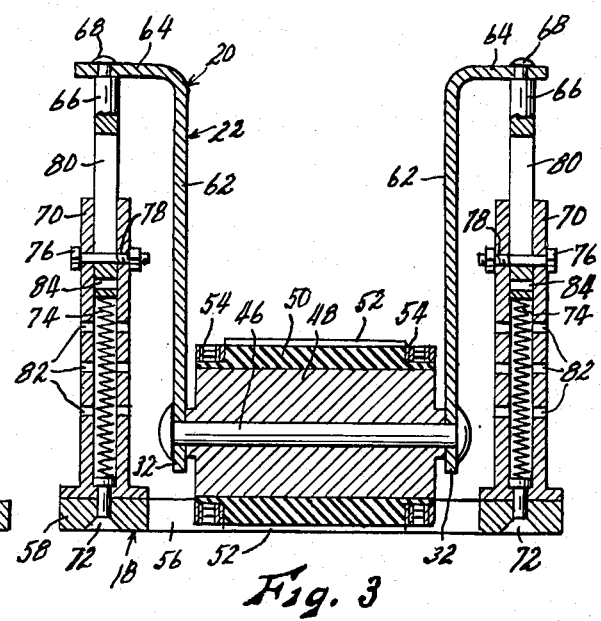

With these objects in view, as well as other objects which will appear in the course of the specification, reference will be had to the accompanying drawing, wherein:

FIG. 1 is a fragmentary side elevational view of the rear wheel and associated parts of a motorcycle, showing a ski attachment embodying the present invention operatively mounted thereon, FIG. 2 is an enlarged, fragmentary sectional view taken on line II—II of FIG. 1, with the cycle wheel left in elevation, FIG. 3 is an enlarged sectional view taken on line III—III of FIG. 1, with parts left in elevation and partially broken away, FIG. 4 is an enlarged sectional view taken on line IV—IV of FIG. 1, with the cycle wheel omitted, and FIG. 5 is a fragmentary sectional view taken on line V—V of FIG. 4.

Like reference numerals apply to similar parts throughout the several views, and the numeral 2 applies generally to a motorcycle shown fragmentarily, having a main frame 4 including a pair of rearwardly extending, spaced apart fork arms 6 with the rear axle 8 of the cycle extending transversely between the rearward ends thereof. The rear ground-engaging wheel 10 of the cycle is of course rotatable, and is carried on axle 10. Said rear wheel customarily includes an inflatable tire 12. Also mounted on axle 8, and rotatable with wheel 10, is a sprocket wheel 14 which is meshed with a sprocket chain 16 driven by the engine of the cycle to propel the cycle, in a manner well known in the art and not here shown.

The ski attachment forming the subject matter of the present invention is designated generally by the numeral 18, and includes an attachment frame 20 pivotally mounted on axle 8. Said attachment frame includes a pair of generally planar A-shaped units 22 disposed respectively at opposite sides of wheel 10 in planes normal to said axle. Each unit 22 is provided at its upper end with a hub member 24 mounted pivotally on the associated end of axle 8 and held thereon by a retainer washer 26 and nut 28, downwardly divergent side arms 30, a cross bar 32 connecting the lower ends of side arms 30 and extending forwardly and rearwardly thereof, and a cross bar 34 extending between side arms in spaced relation above cross bar 32. A-units 22 are rigidly joined to constitute attachment frame 20 a unitary structure by cross bars 36 extending transversely and horizontally between lower cross bars 32 thereof.

Extending transversely between and affixed at their ends in A-units 22, generally at the ends of cross bars 34, are a pair of axles 38 which are parallel to axle 8. Mounted rotatably on each of axles 38 is a drive roller 40. The central portion of each of rollers 40 is concave to engage the periphery of tire 12, being formed of spaced discs 42, as best shown in FIGS. 2 and 4, to prevent collection and clogging of snow between the tire and the roller, and each roller carries a sprocket wheel 44 of larger diameter at each end thereof. The discs 42 and sprocket wheels 44 of each roller constitute a unitary structure. The rollers are so spaced from axle 8 as to insure firm contact of discs 42 with tire 12, so that rotation of wheel 10 will cause said rollers to turn. Good driving contact may be insured by so spacing axles 38 from axle hubs 24 that tire 12 must be partially deflated to permit hubs 24 to be mounted on axle 8, then reinflating the tire after the hubs are applied.

Extending transversely between and affixed in lower cross bars 32 of A-units 22 are a plurality of axles 46, on each of which is rotatably mounted a roller 48. Two of said rollers are disposed respectively at the forward and rearward ends of cross bars 32, and hence respectively forwardly and rearwardly of front and rear drive rollers 40, two are disposed respectively directly beneath the two drive rollers, and one is at the midpoint of cross bars 32. Trained around all of rollers 48 is a flexible, endless traction belt 50 formed of rubber or the like, and the outer surface of which may be formed with transverse cleats 52, or otherwise roughened, to provide good traction on a snow surface. Bonded into each peripheral edge of belt 50 is a sprocket chain 54, each of which is meshed with the corresponding sprocket wheels 44 of the two drive rollers 40. The belt rollers 48 directly beneath the drive rollers serve to hold the sprocket chains firmly meshed with the sprocket wheels. Thus as drive rollers 40 are turned by cycle wheel 10, said drive rollers in turn drive belt 50, in the same direction as wheel 10 is turning, since the drive rollers in this respect act as idler wheels.

Belt 50 is carried for vertical movement in a central rectangular aperture 56 of a ski member 58, which has the usual form of a planar slat with its forward end tapered to a point and curved upwardly as indicated at 60 to prevent it from digging into the snow surface. The attachment frame 20 is connected to the ski 58 by vertically yieldable means adjacent each of the four corners of aperture 56. The lower portion of frame 20 is of such horizontal dimensions that it, along with belt 50, can pass vertically through said aperture. At each end of each of cross bars 32 of the frame there is provided a vertical upright 62 which has its upper end portion turned outwardly as indicated at 64 to overlie the side portion of the ski. A depending vertical plunger 66 is affixed to portion 64 by rivet 68, and its lower end portion is disposed for vertical sliding movement in a tubular socket member 70 which in turn is fixed at its lower end to ski 58 by rivet 72 (see FIG. 3). A compression spring 74 is disposed in said socket member between the lower end thereof and the bottom end of plunger 66. A bolt 76 is extended transversely through a hole 78 provided therefor in socket member 70, said bolt also extending through a longitudinally elongated slot 80 formed in plunger 66, whereby to permit limited movement of the plunger in the socket, against the pressure of spring 74. Alternatively, bolt 76 may be inserted selectively through any one of a series of other holes 82 formed transversely in the socket member, and through an unslotted hole 84 of the plunger, whereby to lock the belt with its lower reach at any of several fixed degrees of extension below the lower surface of the ski, for a purpose to be described.

A spring stabilizer 86 (see FIG. 1) interconnects main cycle frame 4 with attachment frame 20 at points remote from axle 8. Said stabilizer constitutes a telescopically extensible and retractable tubular body member 88, pivoted at its respective ends to cycle frame 4 at 90, and to attachment frame 20 at 92, and enclosing therein a tension-compression spring 94 anchored to body 88 at both ends. It will be understood that said spring is relaxed when ski 58 is in a normal position relative to the cycle, but may yield in either direction to permit pivoting of frame 20 on axle 8.

While the front ski of the device, attachable to the front wheel of the motorcycle, is not shown, it will be understood that it may be generally similar to that shown for the rear wheel, except of course that the front ski need not be provided with a traction belt corresponding to belt 50, and that the attachment frame of the front ski, corresponding to frame 20 of the rear ski may be attached directly to the front ski, without vertically yieldable spring means.

In operation, it will be understood that while the drawing shows belt 50 in its fully elevated position relative to the ski, that is, with bolts 76 engaged in the lower ends of plunger slots 80, and wherein the lower belt reach is flush with the bottom ski surface, nevertheless this is not a normal operating position of the belt. As long as springs 74 are not of sufficient total strength to support the proportion of the weight of the cycle and rider carried by rear axle 8, and they are carefully selected to be of less strength when plungers 66 are fully elevated, then it will be apparent that when the ski is resting normally on a snow surface, the rear axle load of the cycle, which of course is carried directly by attachment frame 20, will force springs 74 to yield, and the lower belt reach will be extended below the ski. The belt of course carries a portion of the axle load, but as springs 74 are compressed, a larger and larger proportion of the axle load is transferred to ski 58, until the sum of the loads supported by the belt and the ski equals the full axle load. If the strength of springs 74 has been properly selected, a condition will thus be attained wherein the belt projects far enough below the ski to compact the snow sufficiently to provide good traction for the belt, while at the same time the ski supports enough of the total load to limit the total penetration of the belt into the snow to prevent bogging down and total clogging of the belt. On relatively soft snow surfaces, the projection of the belt below the ski will be relatively great, as required for traction, since this condition requires that a larger proportion of the axle load be carried by the ski, which in turn requires greater compression of springs 74, which results in greater extension of the belt below the ski. On relatively hard snow surfaces, the projection of the belt below the ski will be relatively less. Use of the ski, rather than riding on the belt alone, not only prevents bogging down of the belt in soft snow, as already described, but also preserves much of the free gliding or virtual "flying" sensation so prized by ski enthusiasts. The relationship of the belt to the ski adjusts automatically whenever the degree of hardness of the snow surface being traversed changes, so than an optimum relationship is maintained at all times despite such changes.

Nevertheless, under some conditions, as when operating on a known snow surface of uniform hardness, it may be desired to position the belt at a fixed degree of extension below the ski. This may be accomplished by extending bolts 76 through holes 84 of plungers 66, and through any of holes 82 of sockets 70. For example when racing on hard snow surfaces, it may even be desired to elevate the ski completely out of contact with the snow, to provide maximum belt traction. This may also be accomplished by proper setting of bolts 76.

The belt 50 is of course driven by rotation of rear cycle wheel 10, through drive rollers 40, sprockets 44 thereof, and belt chains 54, as already described. Drive rollers 40 are so disposed that tire 12 of wheel 10 is spaced out of engagement with the belt, as shown, since any contact between the tire and the belt would tend to produce a reverse operation of the latter. Since rear wheel 10 serves as the prime mover for the ski attachment, and is in turn controlled by the power plant and speed controls of the motorcycle, the ski attachment itself requires no separate prime mover or speed controls. Also, the standard braking system of cycle wheel 10, not shown, serves also to brake belt 50 to slow and stop the cycle when on skis.

The pivotal mounting of attachment frame 20 on axle 8 permits the ski and belt to rock about said axle to accomodate themselves to localized irregularities of the snow surface being traversed, while at the same time always maintaining an operative relationship between tire 12 and drive rollers 40. Such rocking movement is of course restricted and resisted by stabilizer 86, but not with a materially great force. If during high speed operation the ski and belt should leave the snow surface completely, the stabilizer will prevent unrestrained rocking of frame 20 on axle 8, so that the belt and ski will be maintained in position to engage the snow surface properly when the cycle again falls.

While I have shown and described a specific embodiment of my invention, it will be readily apparent that many minor changes of structure and operation could be made without departing from the spirit of the invention.

What I claim as new and desire to protect by Letters Patent is:

1. For use in combination with a motorcycle having a main frame and a power driven rear ground-engaging wheel, a ski attachment comprising:
   a. an attachment frame including means for mounting it on said main cycle frame,
   b. an endless traction belt carried operably by said attachment frame so as to be disposed beneath said rear cycle wheel, and having a normally horizontal lower reach,
   c. a ski having an aperture formed therethrough,
   d. attaching means connecting said ski to said attachment frame so that said belt is disposed within the aperture of said ski and its lower reach engages a snow surface beneath said ski,
   e. at least one drive roller carried rotatably by said attachment frame, said drive roller including a friction portion engageable with said cycle wheel whereby said roller is turned by rotation of said wheel, and a sprocket wheel rotatable with said friction portion, and
   f. a flexible sprocket chain affixed peripherally to said traction belt and meshed with said sprocket wheel.

2. For use in combination with a motorcycle having a main frame and a power driven rear ground-engaging wheel, a ski attachment comprising:
   a. an attachment frame,
   b. means for mounting said attachment frame on said main frame, said mounting means being operable to permit pivotal movement of said attachment frame relative to said cycle frame on a horizontal axis transverse to the line of cycle travel,
   c. an endless traction belt carried operably by said attachment frame so as to be disposed beneath said rear cycle wheel, and having a normally horizontal lower reach,
   d. a ski having an aperture formed therethrough,
   e. attaching means connecting said ski to said attachment frame so that said belt is disposed within the aperture of said ski and its lower reach engages a snow surface beneath said ski, said pivotal connection of said attachment frame to said main cycle frame permitting said belt and ski to pivot to follow irregularities of the snow surface being traversed, and
   f. power means operable to drive said traction belt.

3. The structure as recited in claim 2 with the addition of resilient means biasing said attachment frame yieldably toward a position relative to said main cycle frame wherein said belt and ski are disposed generally horizontally.

4. The structure as recited in claim 1 wherein said mounting means for mounting said attachment frame on said main cycle frame is operable to permit pivotal movement of said attachment frame relative to said cycle frame on a horizontal axis coaxial with the rotational axis of said rear cycle wheel, whereby said attachment frame pivots coaxially with said wheel.

5. For use in combination with a motorcycle having a main frame and a power driven rear ground-engaging wheel, a ski attachment comprising:
   a. an attachment frame including means for mounting it on said main cycle frame,
   b. an endless traction belt carried operably by said attachment frame so as to be disposed beneath said rear cycle wheel, and having a normally horizontal lower reach,
   c. a ski having an aperture formed therethrough,
   d. attaching means connecting said ski to said attachment frame so that said belt is disposed within the aperture of said ski and its lower reach engages a snow surface beneath said ski, said attaching means being vertically adjustable, whereby the lower reach of said traction belt may be disposed selectively at different distances below the bottom surface of said ski, and
   e. power means operable to drive said traction belt.

6. For use in combination with a motorcycle having a main frame and a power driven rear ground-engaging wheel, a ski attachment comprising:
   a. an attachment frame including means for mounting it on said main cycle frame,
   b. an endless traction belt carried operably by said attachment frame so as to be disposed beneath said rear cycle wheel, and having a normally horizontal lower reach,
   c. a ski having an aperture formed therethrough,
   d. attaching means connecting said ski to said attachment frame so that said belt is disposed within the aperture of said ski and its lower reach engages a snow surface beneath said ski, said attachment means being resiliently yieldable in a vertical direction, whereby the lower reach of said traction belt may be extended further beneath said ski through the aperture thereof against the increasing resistance of said attaching means.

7. The structure as recited in claim 6 wherein said attaching means connecting said ski to said attachment frame comprises;
   a. a plurality of upwardly opening socket members affixed to said ski and projecting upwardly therefrom,
   b. a plurality of depending plungers affixed to said attachment frame and each engaged slidably in one of said socket members,
   c. springs yieldably resisting downward movement of each of said plungers in its associated socket member, and
   d. means positively limiting upward movement of each of said plungers in its associated socket member.

* * * * *